April 19, 1927.
L. N. BOWMAN
LIQUID FUEL
Filed Aug. 1, 1925
1,625,237
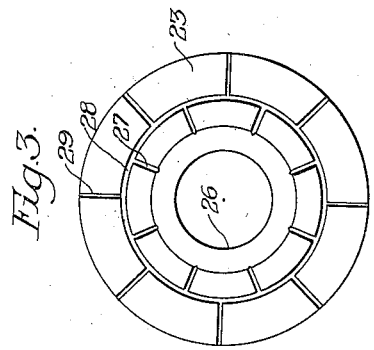
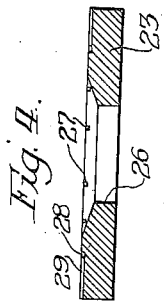
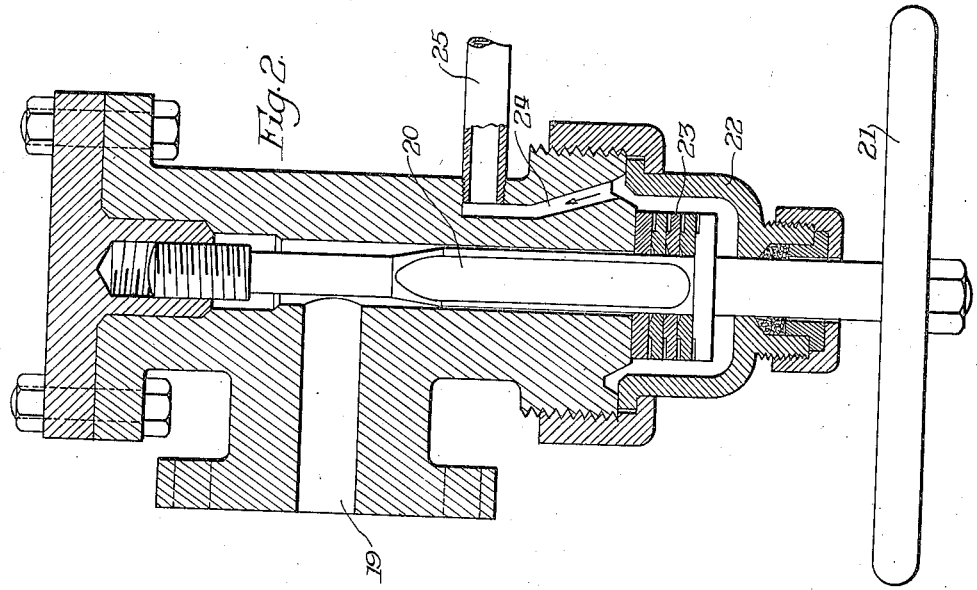
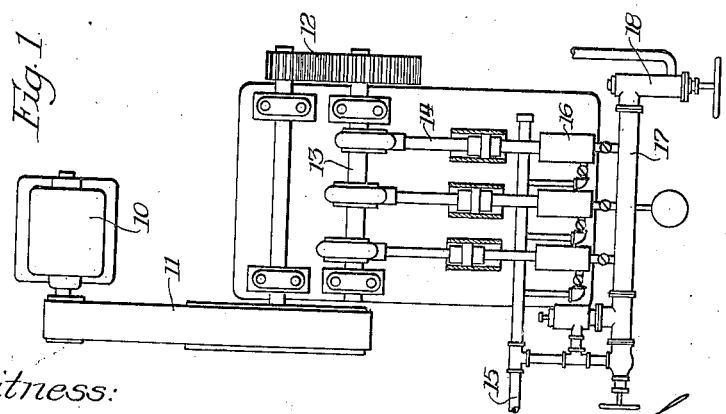

Patented Apr. 19, 1927.

1,625,237

UNITED STATES PATENT OFFICE.

LEWIS N. BOWMAN, OF CHICAGO, ILLINOIS, ASSIGNOR OF ONE-EIGHTH TO H. H. HARRISON AND ONE-EIGHTH TO A. R. WHITE, BOTH OF CHICAGO, ILLINOIS.

LIQUID FUEL.

Application filed August 1, 1925. Serial No. 47,553.

My invention relates to a process for treating residual oils from petroleum cracking, and is a modification of the process described and claimed in my copending application, Serial No. 43,370, filed July 13, 1925.

As pointed out in my prior application, the residue from distilling processes is commonly in the form of a low gravity oil having a high B. t. u. content but containing, in temporary suspension, large quantities of carbon in a finely divided condition. The state of subdivision is such that the carbon particles cannot be removed by screening or straining and yet precipitation will take place continuously for a relatively long period of time, resulting in the clogging of pipe lines, burners and containing vessels. For this reason, the product is of little value commercially, its use being limited to combustion at a point closely adjacent to the point of production.

Because of the high heating value of the product, I have contended that it should be made available for general use, and to that end have proven that if the particles in temporary suspension therein be reduced in size to a point approaching molecular subdivision, at which point the force of gravity will be overbalanced by the surface forces, the particles will remain in relatively permanent suspension. Thus the heating value of the liquid will not be reduced as occurs when the free carbon is removed.

I am aware that efforts have been to accomplish the result of more complete subdivision of the carbon particles, but the expense incident to any such process has defeated the main purpose—that of producing a permanent and cheap, liquid fuel. In the process herein disclosed, the expense of operation is comparatively small and the results secured are highly satisfactory.

In the carrying out of the process, the liquid containing the carbon in suspension is passed between closely adjacent surfaces under extremely high presure with the result that there is believed to be not only a breaking up of the free carbon, but an actual molecular redistribution. To what extent this is secured is not at this time known, but at any rate, the resultant product has a high heating value and there is no apparent precipitation, even after standing undisturbed for several months.

I will not attempt herein to state definitely that there is a chemical change due to readjustment of the carbon molecules, although I believe such to be the case. In Liddell, Colloidal Chemistry, it is said, "If subdivision is profound enough, a chemical combination may result. In fact before substances react chemically, their particles must first be brought into close proximity by solution, fusion, ionization or even pressure, as was shown by W. Spring, who caused dry powders to unite chemically by extremely high pressure."

The enormous pressure exerted in the treatment together with the concentrated stress resulting from the frictional resistance is believed to cause an enormously increased activity in the molecules and a consequent readjustment. Even though this theory be incorrect, the fact remains that the carbon particles after having been subjected to the described action, are in a state of extreme colloidal subdivision.

The process will be more readily understood by reference to the accompanying drawings, in which;

Fig. 1 is a plan view, somewhat diagrammatic in character, showing apparatus such as contemplated, Fig. 2 is a sectional view through a valve constructed to effect the desired action;

Fig. 3 is a plan view of one of the plates employed in the valve, and

Fig. 4 is a sectional view through the plate shown in Fig. 3.

The apparatus herein described and shown is not novel, and no claim is made to such apparatus. It may advantageously consist of a motor, 10, suitably connected by means of a belt, 11, and reducing gears, 12 to a crank shaft, 13, from which the pitmen, 14, are operated. The oil to be treated is admitted through the pipe, 15, and delivered to the cylinders, 16, in which it is compressed and delivered to the manifold, 17, thence to the valve, 18. The valve comprises a casing having an entrance port, 19, and a fluted valve stem, 20, controlled by a hand wheel, 21. A bonnet, 22, encloses the plates, 23, best shown in Figs. 3 and 4. These plates surround the stem, a plurality thereof being provided. The oil is forced between the discs or plates and escapes through the outlet, 24, into the discharge pipe 25.

The plates, 23, are in the form of flat discs having a central opening, 26, and provided on one face with a series of intersecting circular and radial grooves. The radial grooves, 27, communicate with the circular groove, 28, and the radial grooves, 29, likewise communicate with the circular groove in staggered relation to the grooves, 27. The depth of the grooves in the plate is much exaggerated in the drawing, such grooves being very shallow and of such dimensions that the oil passes therethrough with difficulty and only under extremely high pressure.

The desired reducing action on the carbon particles is secured by reason of combined friction resistance and impact. The oil is forced between the closely positioned surfaces at very high pressure with the result that many of the carbon particles are torn apart. The oil that travels along the path outlined by the grooves is caused to move at high velocity and as the direction of travel is frequently changed, the carbon particles that might be too large to pass through the space between the plates are broken up and caused to permeate the liquid in the form of a colloidal subdivision.

Obviously the exact contour of the plate faces is not essential in order to secure the results herein claimed, and I do not wish to be limited except as indicated in the appended claims.

I claim:

1. A liquid fuel obtained by passing a residual oil from petroleum distillation containing free carbon in temporary suspension between closely adjacent surfaces at high pressure and high velocity and causing an abrupt change in the direction of flow of said oil.

2. A liquid fuel obtained by forcing oil containing solid carbon particles between plates under relatively enormous pressure and effecting abrupt changes in the direction of flow of said oil while passing between said surfaces whereby said particles are broken up by impact.

3. A liquid fuel obtained from a residual oil containing particles of carbon in temporary suspension, by forming the oil into minute streams under relatively high pressure and changing the pressure head into velocity head, then causing the streams to impinge on surfaces to break up the carbon particles.

In testimony whereof I have affixed my signature.

LEWIS N. BOWMAN.